United States Patent
Hoeller et al.

(10) Patent No.: US 11,683,152 B2
(45) Date of Patent: Jun. 20, 2023

(54) SYSTEM AND METHOD USING A LOCALLY REFERENCED BLOCKCHAIN

(71) Applicant: Infineon Technologies AG, Neubiberg (DE)

(72) Inventors: Andrea Hoeller, Graz (AT); Walther Pachler, Graz (AT)

(73) Assignee: Infineon Technologies AG, Neubiberg (DE)

( * ) Notice: Subject to any disclaimer, the term of this patent is extended or adjusted under 35 U.S.C. 154(b) by 251 days.

(21) Appl. No.: 17/066,601

(22) Filed: Oct. 9, 2020

(65) Prior Publication Data

US 2021/0111866 A1  Apr. 15, 2021

(30) Foreign Application Priority Data

Oct. 9, 2019 (DE) .......................... 102019215485.9

(51) Int. Cl.
| | |
|---|---|
| *H04L 29/06* | (2006.01) |
| *H04L 9/06* | (2006.01) |
| *H04W 4/80* | (2018.01) |
| *H04L 9/32* | (2006.01) |

(52) U.S. Cl.
CPC .......... *H04L 9/0637* (2013.01); *H04L 9/3247* (2013.01); *H04W 4/80* (2018.02); *H04L 2209/80* (2013.01)

(58) Field of Classification Search
CPC . H04L 9/0637; H04L 9/3247; H04L 2209/80; H04W 4/80
See application file for complete search history.

(56) References Cited

U.S. PATENT DOCUMENTS

| 11,088,827 B2 * | 8/2021 | Kanza | H04L 9/3247 |
| 11,138,608 B2 * | 10/2021 | Green | H04L 9/0643 |
| 2019/0166459 A1 | 5/2019 | Wootton et al. | |
| 2019/0333031 A1 * | 10/2019 | Kravitz | G06Q 20/06 |
| 2021/0097528 A1 * | 4/2021 | Wang | G06Q 20/3825 |
| 2021/0103938 A1 * | 4/2021 | Bulawski | H04L 9/50 |

* cited by examiner

*Primary Examiner* — Shawnchoy Rahman
(74) *Attorney, Agent, or Firm* — Cooper Legal Group, LLC

(57) ABSTRACT

A method comprises generating a signed blockchain transaction using a secure computing device arranged in a local area, and an apparatus set up for short-range communication. The method comprises associating the signed blockchain transactions with the local area, wherein the signed blockchain transaction indicates a presence of the apparatus in the local area.

20 Claims, 5 Drawing Sheets

SYSTEM AND METHOD USING A LOCALLY REFERENCED BLOCKCHAIN

RELATED APPLICATION

This application claims priority to German Patent Application No. 102019215485.9, filed on Oct. 9, 2019, entitled "System und Verfahren mit einer örtlich bezogenen Blockchain", which is incorporated by reference herein in its entirety.

SUMMARY

The present disclosure relates to a system and a method using a locally associated blockchain transaction. For example, the present disclosure relates to demonstrating a presence in an area (location oracle) with hardware-based security for blockchain applications.

Some situations can require the position or location of a person or item to be demonstrated. This can give rise to the problem of demonstrating that a specific person or the specific item is present in a specific area (e.g., a location) and/or that this takes place at a specific time.

One area of application is games, for example. As such, geocaching (GPS treasure hunting) can require demonstration that the player was present at a specific location. Up to now, the player has been able to write his or her name on a piece of paper. When orienteering, it may also be necessary to demonstrate that the player was at a specific location, with a time stamp needing to be included in this case. Some computer-based games require evidence that the player was in certain places in order to receive special rewards, for example by demonstrating that the player was at a location at which playing pieces are arranged in the game. Furthermore, it may be conceivable to demonstrate that somebody was themselves present at specific locations, for example in order to substitute selfies.

Besides the field of games, there is also the field of work. As such, for example a car park attendant may be intended to provide evidence that he or she was at specific locations. A truck driver can likewise demonstrate such a requirement. Similar requirements can arise for a delivery chain.

Additionally, evidence can also be required in the field of the Internet of Things (IoT), for example a robot demonstrating that it was at a specific location.

Local presence can be demonstrated using sensor data, for example GPS (global positioning system), WLAN (wireless networks), mobile radio networks, acceleration sensors, and the like.

Designs and/or configurations for demonstrating position that are forgery-proof would be desirable.

According to one exemplary embodiment, a method comprises generating a signed blockchain transaction using a secure computing device arranged in a local area, and an apparatus set up for short-range communication (e.g., reciprocal short-range communication). The method comprises associating the signed blockchain transaction with the local area, such that the signed blockchain transaction indicates a presence of the apparatus in the local area and/or associates a presence of the apparatus with the local area. Associating the signed blockchain transaction with the local area achieves a high level of reliability for the demonstration of a local presence of the apparatus in the local area, since the short-range communication requires the presence and the blockchain transaction provides a high level of protection against forgery.

According to one exemplary embodiment, a system comprises a secure computing device arranged in a local area and set up for a short-range communication. The system comprises an apparatus that is likewise set up for the short-range communication. The apparatus is configured to transmit a blockchain transaction to the secure computing device using the short-range communication. The secure computing device is configured to receive the blockchain transaction, sign the blockchain transaction using a signature to obtain a signed blockchain transaction, and transmit the signed blockchain transaction to at least one of the apparatus or a subscriber (e.g., other than the apparatus) in the system. The system is configured to integrate the signed blockchain transaction into a blockchain, and associate the local area with the signature, such that the signed blockchain transaction indicates a presence of the apparatus adjacent to the secure computing device in the local area and/or associates a presence of the apparatus adjacent to the secure computing device with the local area.

Further exemplary embodiments are defined in the dependent claims.

DESCRIPTION OF THE DRAWINGS

Preferred exemplary embodiments of the present disclosure are explained below with reference to the accompanying drawings, in which.

DETAILED DESCRIPTION

Before exemplary embodiments of the disclosed subject matter are explained more specifically in detail below on the basis of the drawings, it is pointed out that elements, objects and/or structures that are identical, have the same function or have the same effect are provided with the same reference signs in the different figures, which means that the description of these elements that is depicted in different exemplary embodiments is interchangeable or can be applied to one another.

Exemplary embodiments relate to the use of a blockchain transaction. A blockchain transaction relates to the addition of a data record or a block to a number of blocks and to concatenation or linking of this new block to the existing blocks, if need be using cryptographic methods. Since the blocks are accessible to all subscribers in the system, a high level of protection against forgery can be obtained.

Exemplary embodiments relate to short-range communication. This is understood to mean wired or wireless communication over short distances, for example less than 100 meters, less than 50 meters, less than 10 meters or less than 1 meter, including ranges of a few centimeters, for example less than 50 cm, less than 20 cm or less than 10 cm. As a result, the short-range communication allows a local reference to be produced between the communication partners, that is to say that the communication partners can be assumed to be present within the same physical area limited by the capabilities or range of the short-range communication. If for example one of the communication partners is considered to be locally invariable or as a reference position or reference location, the presence of the other communication partner in the area of the reference communication partner can be assumed. Examples of a short-range communication are for example Bluetooth® connections, connections within a wireless local area network (WLAN) or a near field communication (NFC). As an alternative or in addition to the use of radio signals, optical and/or acoustic signals can be transmitted.

Figure 1:
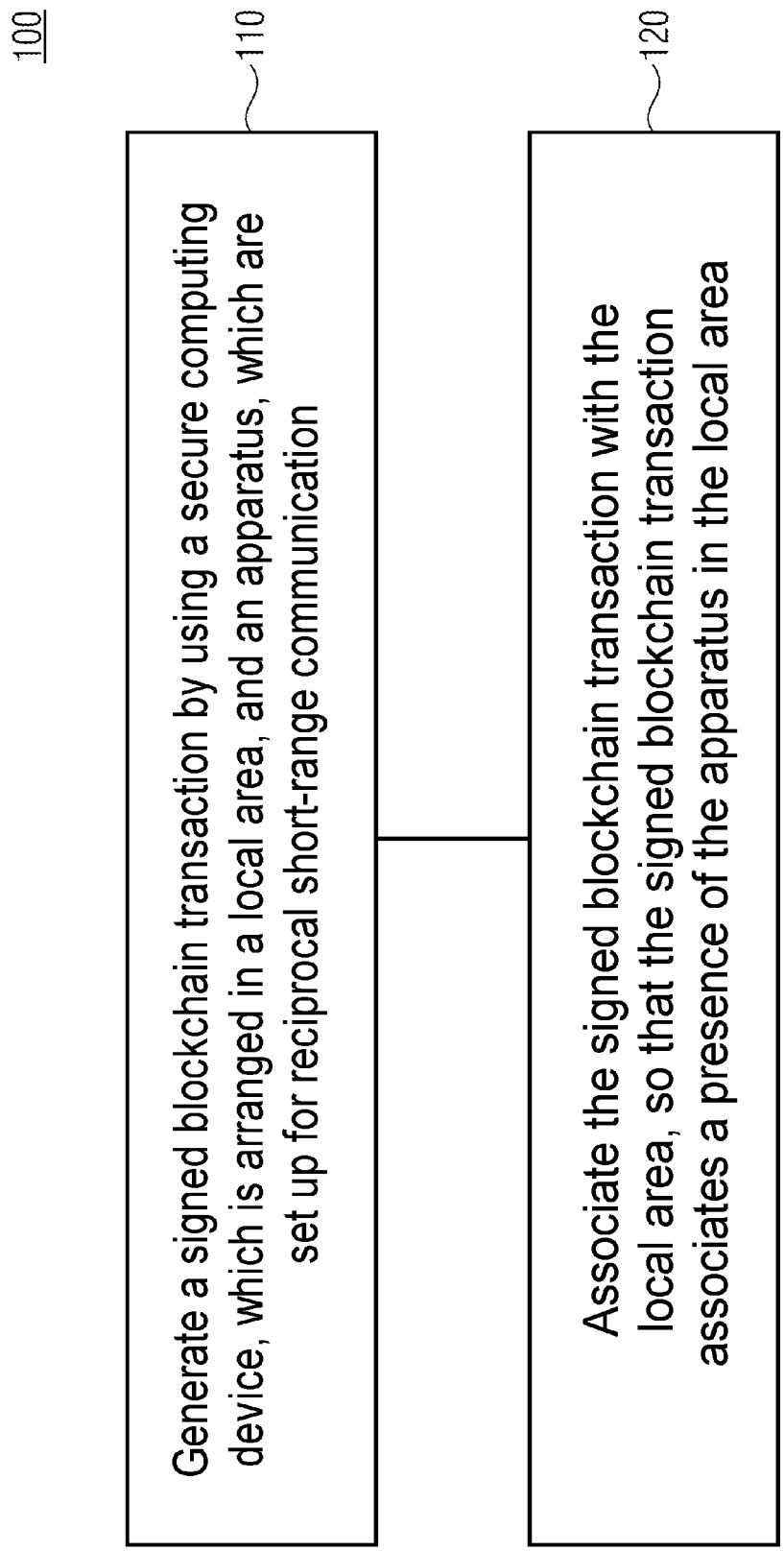
FIG. 1 shows a schematic flow diagram for a method according to an exemplary embodiment.

FIG. 1 shows a schematic flow diagram for a method 100 according to an exemplary embodiment. An act 110 comprises generating a signed blockchain transaction using a secure computing device, which is arranged in a local area, and an apparatus, which are set up for reciprocal short-range communication. An act 120 comprises associating the signed blockchain transaction with the local area, so that the signed blockchain transaction associates a presence of the apparatus in the local area.

Signing a blockchain transaction can be understood to mean that it is possible to trace which of the subscribing nodes or apparatuses has added or produced the signature within the blockchain system. The signature may be unique, which may mean that the signature is associable not only with an identity of the apparatus but also with a local area or a position of the apparatus, for example if this position is known within the blockchain system. As a result, it is possible within the blockchain system to assume or make the association that the two apparatuses involved in the transaction are arranged in physical proximity to one another, at least at a time at which the blockchain transaction is generated, on account of the limited range of the short-range communication.

Figure 2:
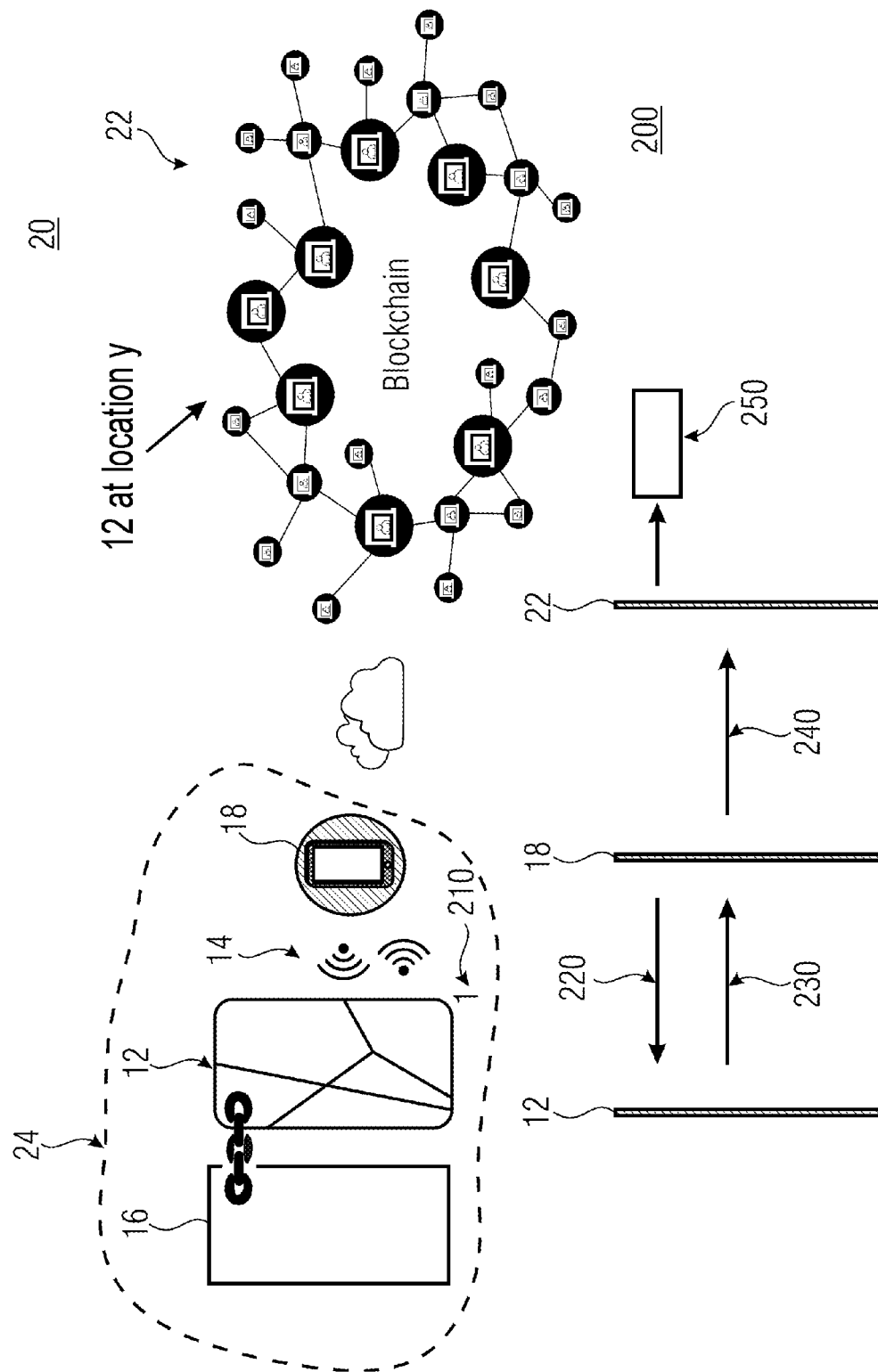
FIG. 2 shows a schematic block diagram of a system according to an exemplary embodiment.

FIG. 2 shows a schematic block diagram of a system 20 according to an exemplary embodiment. The system 20 comprises a secure computing device 12, which is set up for a short-range communication 14. For this purpose, for example, the apparatus 12 can have an appropriately set-up wireless and/or wired communication interface. A secure computing device can be understood to mean computing devices that have specific security measures to protect against manipulation, for example manipulation detection and suitable measures to counteract manipulation. These can include, for example, measures that actively change or terminate operation of the apparatus and/or change and/or erase memory content. Examples of a secure computing device are, for example, security controllers (secure controllers), secure elements or the like.

The secure computing device 12 may be arranged with a variable location and/or a constant, that is to say invariable, location within the blockchain system. For this purpose, the secure computing device may be firmly mechanically connected to a physical object 16. The physical object 16 may be, for example, an immobile object, for example a hydrant, a lamppost, a building or another installation. This allows the position or location of the secure computing device 12 to be equated with the position or location of the physical object 16. This does not preclude another physical object 16 being able to be mobile. It is conceivable for the physical object 16 to be, for example, part of a vehicle on land, in the air and/or on water and/or to be transported by such a vehicle, which may mean that the secure computing device 12 can be regarded as at the possibly fixed location of the otherwise mobile physical object 16.

Although the blockchain transaction can contain an indication of the location of the transaction, this is not required for exemplary embodiments described herein. As such, association of a subscriber or multiple subscribers with a specific location within the network can also provide the indication of the local area implicitly. For example, an identifier of the apparatus 18 or of a user thereof or of the secure computing device 12 may be associated with the applicable location or area, for example in a central and/or distributed database.

The system 20 also comprises an apparatus 18, which is set up for the short-range communication 14. For this purpose, the apparatus 18 can have an appropriately set-up wireless and/or wired communication interface. The apparatus 18 may be a mobile apparatus, for example a cell phone or smartphone, a tablet computer, a laptop, a PDA (personal digital assistant), a smart watch and/or part of a wearable (e.g., an item of clothing set up for communication).

The apparatus 18 is configured to transmit a blockchain transaction to the secure computing device 12 using the short-range communication 14. After the short-range communication 14 has been set up in an act 210 of a method 200, for example, the transaction generated by the apparatus 18 can be transmitted to the secure computing device 12 in an act 220. The secure computing device 12 may be configured to receive the blockchain transaction, and to sign the blockchain transaction using a signature. As a result, a signed blockchain transaction can be obtained. In an act 230, the secure computing device 12 can transmit the signed blockchain transaction to the apparatus 18 using the short-range communication 14.

The blockchain transaction can be signed by the apparatus 18, so that a signed transaction is already transmitted to the secure computing device 12. Alternatively and/or additionally, a signature can be appended by the secure computing device 12, and/or the blockchain transaction can be signed by the secure computing device 12. A signing of the blockchain transaction can comprise the use of a private key of the apparatus 18, and/or of the secure computing device 12. This may mean that the key used is secret according to an exemplary embodiment. Evidence that the apparatus 18 was in the local area 24 can be provided by virtue of the local area 24 being able to be the place (e.g., the only place) where it is possible to use and/or discover the private key of the secure computing device 12, which is stored in the secure computing device 12.

In an act 240, the apparatus 18 can transmit the signed transaction to a blockchain network 22. As an alternative and/or in addition to acts 230 and/or 240, the secure computing device 12 can also transmit the signed blockchain transaction to the blockchain network 22. In an act 250, the blockchain transaction can be stored in the blockchain network such that the distributed account of the blockchain device is recorded with a time stamp and is cryptographically checked and/or is also backed up by nodes and miners. As a result, the applicable information can be available for any subscriber. The transmission of a message to the blockchain network 22, or the system 20, can be effected by transmitting a message to one or more subscribers, which can then distribute the message further.

The system 20 is configured to integrate the signed blockchain transaction into the blockchain, and to associate the local area of the secure computing device 12, or of the physical object 16, with the signature. By transmitting the blockchain transaction to the blockchain system, and/or the applicable subscribers, the signed blockchain transaction can be integrated into the blockchain. This may mean that the blockchain network 20 can assume, and/or it can be assumed within the system, that the signature has been used to generate the transaction in the local area of the secure computing device 12, and/or of the physical object 16. The effect that can be achieved thereby is that the signed blockchain transaction associates a presence of the apparatus 18 adjacent to the secure computing device 12 in the local area 24.

The blockchain transaction can be signed by the apparatus 18, which may mean that a signed transaction is already transmitted to the secure computing device 12. Alternatively or additionally, a signature can be appended by the secure computing device 12, or the blockchain transaction can be signed by the secure computing device 12. A signing of the blockchain transaction can comprise the use of a private key of the apparatus 18, or of the secure computing device 12. This may mean that the key used is secret according to this exemplary embodiment.

Figure 3:
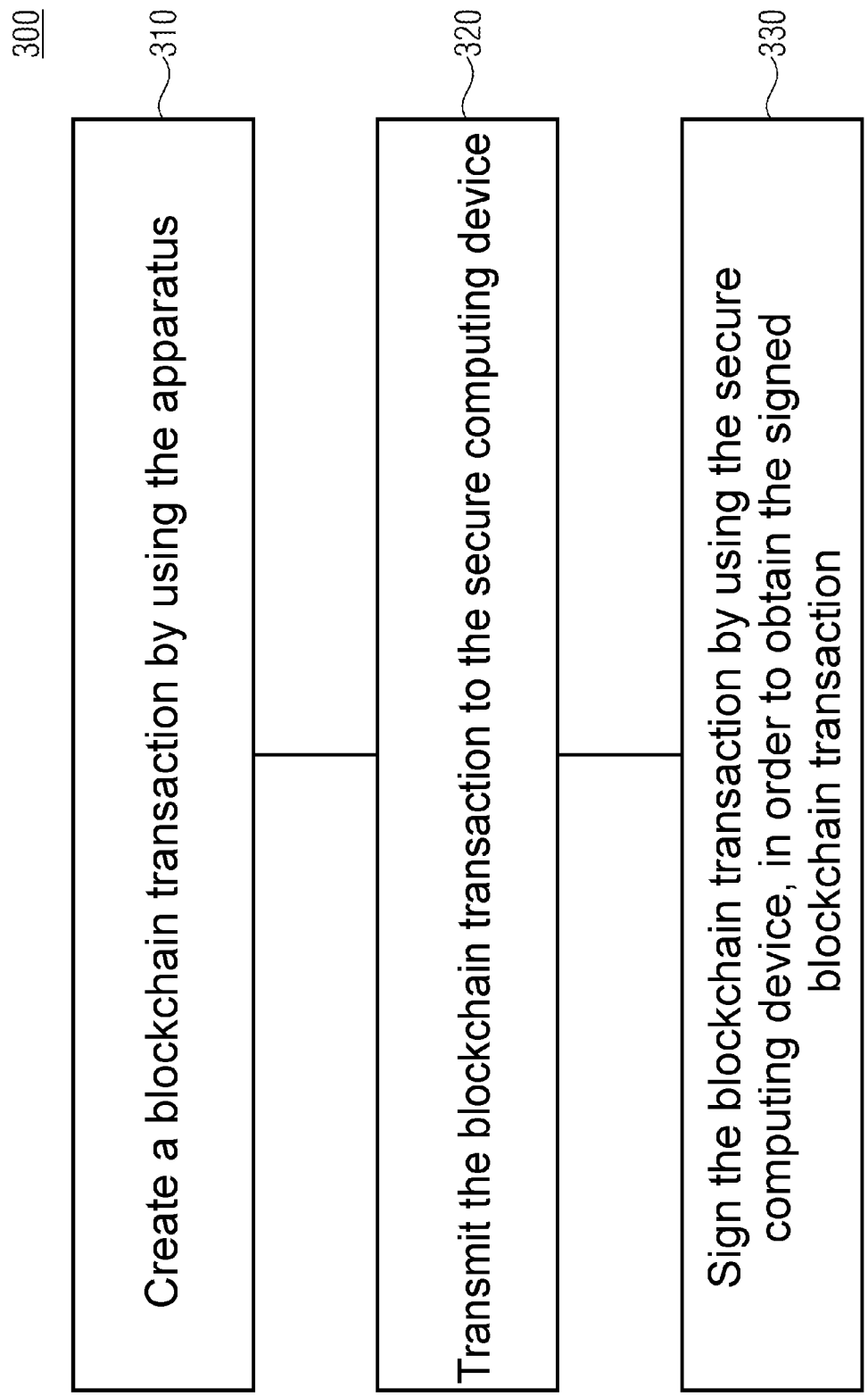
FIG. 3 shows a schematic flowchart for a method according to an exemplary embodiment that can implement at least part of the method from FIG. 1.

FIG. 3 shows a schematic flowchart for a method 300 according to an exemplary embodiment that can implement at least part of act 110. In an act 310, a blockchain transaction is created using the apparatus. In an act 320, the blockchain transaction is transmitted to the secure computing device. Act 320 can correspond to act 220.

In an act 330, the blockchain transaction is signed using the secure computing device, in order to obtain the signed blockchain transaction. This signed blockchain transaction can be transmitted to the apparatus, and/or the blockchain system, by carrying out act 230, for example.

Figure 4:
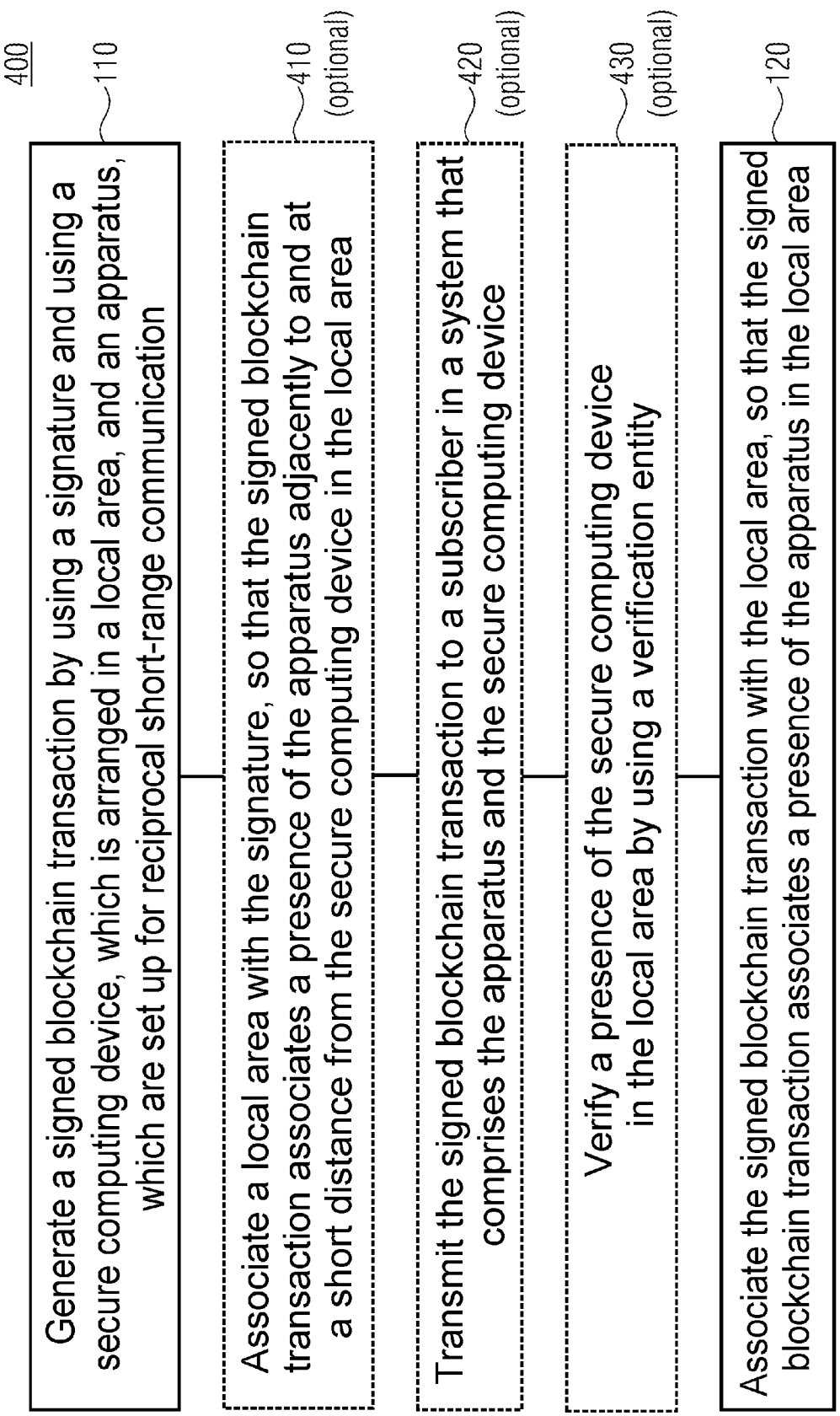
FIG. 4 shows a schematic flow diagram for a method according to an exemplary embodiment that has additional acts over the method from FIG. 1.

FIG. 4 shows a schematic flow diagram for a method 400 according to an exemplary embodiment. The method 400 can comprise acts 110 and 120 of the method 100. Optionally, an act 410, 420 and/or 430 can be carried out. An order of acts 110, 410, 420, 430 and 120 can differ from the depiction in FIG. 4.

An act 410 of the method 400 comprises associating a local area, for example the local area 24, with the signature, so that the signed blockchain transaction associates a presence of the apparatus 18 adjacent to and/or at a short distance from the secure computing device 12 in the local area 24. An association can be made in exemplary embodiments described herein such that the linking or association is documented and/or is recorded in checkable fashion. Act 410 can also comprise assigning a time to the signed blockchain transaction. The effect that can be achieved thereby is that the signed blockchain transaction associates the presence of the apparatus in the local area 24 with the indicated time. Besides the simple presence, a time component can therefore also be integrated into the blockchain transaction.

Act 420 comprises transmitting the signed blockchain transaction to a subscriber in a system that comprises the apparatus and the secure computing device, for example by carrying out act 250.

Act 430 can comprise verifying a presence of the secure computing device in the local area using a verification entity. This may mean that the actual presence of the apparatus 18 in the local area 24 can be witnessed. The verification entity can also be referred to as a witness. This can be understood to mean confirmation of the performed transaction by a third party. This witnessing can be used to confirm that the secure computing device 12 is also arranged in the local area 24, and/or, in simple terms, that at the time of the transaction the secure computing device 12 is at the location with which it is associated within the blockchain system. This can be achieved by appropriate user confirmations, and/or confirmations from other network subscribers.

Figure 5:
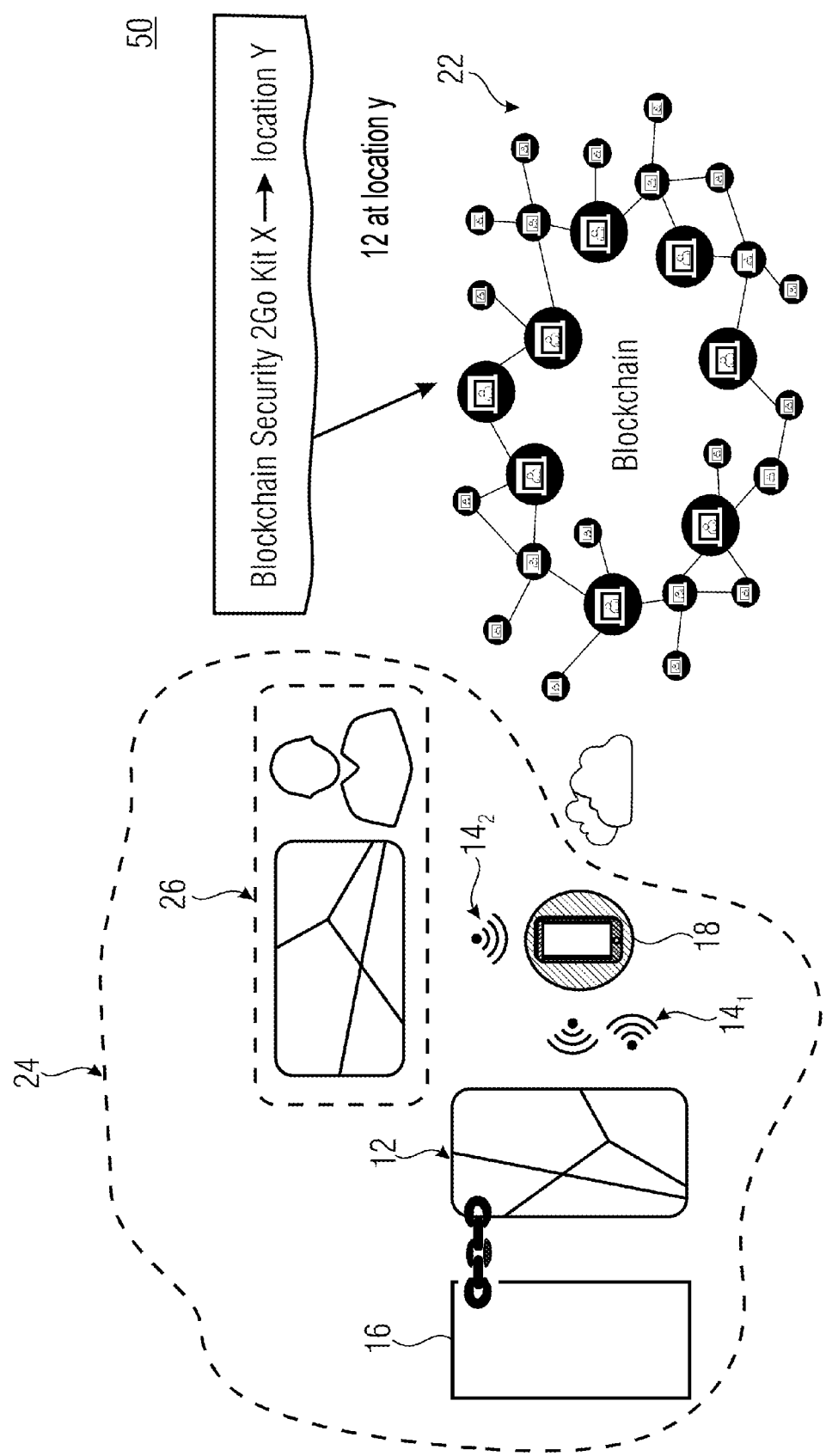
FIG. 5 shows a schematic block diagram of a system according to an exemplary embodiment in which a blockchain transaction can take place with the inclusion of information from a verification entity or witness apparatus.

FIG. 5 shows a schematic block diagram of a system 50 according to an exemplary embodiment. The system 50 may be of similar design and/or configuration to the system 20. However, the transaction between the apparatus 18 and the secure computing device 12 can take place with the inclusion of information from a verification entity and/or witness apparatus 26 that transmits information to the apparatus 18 and/or the secure computing device 12, wherein the information is embedded in the blockchain transaction. The transmission of the information to the apparatus 18, and/or the secure computing device 12, can take place by wire or wirelessly. The use of a short-range communication 14 allows a high level of reliability for this information. This can mean that the verification entity 26 is arranged in the local area 24, even if this is not absolutely necessary.

Methods according to exemplary embodiments can involve the secure computing device being arranged permanently in the local area. A permanent arrangement in the local area can be understood to mean an arrangement such that non-destructive removal by unauthorized parties is not possible. For example, non-destructive removal is not possible if removal would lead to destruction of the physical object 16 and/or the secure computing device 12. For example, the secure computing device 12 may be in the form of a flexible apparatus, for example a chip card and/or a small controller, and/or may be arranged on the physical object 16 by means of adhesive. Alternatively and/or additionally, the secure computing device 12 may be arranged inside a volume of the physical object 16, for example in a housing, cemented in or the like. These are merely exemplary configurations that illustrate that removal of the secure computing device 12 from a permanent arrangement without such removal being noticed by the blockchain network 22 is impossible and/or at least substantially hampered.

Exemplary embodiments described herein relate to methods that are able to be carried out at least partly using hardware and/or at least partly using software. As such, a transaction can be created either by hardware-wired devices or apparatuses or by software. In this respect, exemplary embodiments relate both to computer programs having a program code for performing methods described herein and to data storage media that have stored an applicable computer program, and/or program code, in order to prompt a machine, for example a computer or the like, to carry out a method when the code is executed. However, exemplary embodiments also relate to hardware systems for performing a method according to embodiments described herein.

Exemplary embodiments allow significant obstacles to be provided for the manipulation of presence data, since manipulating a blockchain transaction may be incomparably more difficult than manipulating sensor data, for example GPS data or WLAN data. Furthermore, the use of a blockchain transaction according to exemplary embodiments allows disadvantages of pure GPS-based designs and/or configurations, which are blockable (jammable), to be overcome.

Exemplary embodiments provide for a user wishing to demonstrate presence at a specific location to perform a microtransaction in a blockchain. A witness in the area can confirm the location. Exemplary embodiments can be implemented using one or more protocols such as, for example, FOAM, Helium, Platin and/or XYO. The data foundations may be a positioning system such as, for example, global positioning system (GPS), Glonass and/or Galileo, but it is alternatively or additionally also possible to use wireless networks and/or access points and/or a network of radio frequencies.

In other words, the method can be carried out as described in the context of FIG. 2. Additionally, a transaction of the user of the apparatus 18 can be performed using a user-specific key pair, for example by means of a blockchain card that belongs to the user. Alternatively and/or additionally, a multisigned transaction can be performed, for example "2-out-of-2". This can allow the transaction to be regarded as valid if and/or only if the user signs the transaction and the physical object 16, and/or the secure computing device 12 signs the transaction. This can allow it to be demonstrated that a specific user and not just the apparatus 18 is and/or was present at the applicable position, and/or the local area 24.

In other words, exemplary embodiments propose obtaining the evidence of a location by virtue of a hardware-based security controller (e.g., a secure computing device) being installed at a known place and/or location, preferably in a forgery-proof manner. The secure computing device 12 can have a no-contact communication interface, for example.

The hardware-based security controller can have a public/private key pair and can be used as a blockchain account. Evidence of the location can be provided by virtue of the user apparatus, for example a smartphone, generating a transaction. The transaction is signed by the hardware-based security controller, as a result of which evidence that the apparatus 18 was and/or is in physical proximity to the security controller is obtained. The apparatus sends the microtransaction to the blockchain network. This information is then available transparently and/or can have a time stamp. Optionally, a multisignature "2-out-of-2" can be provided, which may mean that the user also signs the transaction, as a result of which evidence that the correct user has initiated the transaction can be obtained. A basis of trust that the security controller is at the applicable position can be obtained, for example, by virtue of the position, or the local area 24, being confirmed by a party that employs and/or sets up the security controller. This could include, for example, a company that monitors a car park, a logistics company or the like. Alternatively and/or additionally, the basis of trust can be provided by virtue of the position being confirmed by users. The more users confirm that the security controller is at the applicable position, the more trustworthy this information can be considered, that is to say the more this assessment and/or information is trusted.

Exemplary embodiments enable it to be admittedly possible but not necessary to trust user apparatuses within the blockchain network. It is not necessary to trust an external infrastructure at any rate. The time stamp and the logging of the location can be backed up by the blockchain network, in order to obtain evidence of the local area and possibly the time. A multisignature approach can allow the effect achieved by authentication of the user and the local area to be that the user can demonstrate that he or she was at a specific location at a specific time. Exemplary embodiments can easily be implemented and allow a high level of reliability. Exemplary embodiments are based on fixing a hardware-based security chip, which stores a secret key, physically at a specific position. An apparatus can demonstrate that it is close to the hardware-based security chip by performing a cryptographic transaction with the secret key of the hardware-based security chip. A physical connection, possibly deemed unbreakable, between the hardware-based security controller and a physical object allows the blockchain transaction to be provided with the associated significance that it was performed at the location of the physical object. The control room keys stored on the hardware-based security controllers can remain there, that is to say that there may be provision for such keys not to be communicated, but rather to be used merely for internal signing of the transactions received from the apparatus 18. This can also be achieved for example by dispensing with backups or the like. Exemplary embodiments therefore relate to the use of an asymmetric cryptography. Other exemplary embodiments relate to the secure computing device 12 having stored what are known as tokens used for communication. Applicable key pairs may likewise be stored in the secure computing device 12 and used for the encryption.

Although some aspects have been described in connection with an apparatus, it goes without saying that these aspects are also a description of the corresponding method, which may mean that a block or a component of an apparatus is also intended to be understood as a corresponding method act or as a feature of a method act. Analogously, aspects described in connection with or as a method act are also a description of a corresponding block or detail or feature of a corresponding apparatus.

Depending on particular implementation requirements, exemplary embodiments of the disclosed subject matter may be implemented in hardware or in software. The implementation can be performed using a digital storage medium, for example a floppy disk, a DVD, a BluRay Disk, a CD, a ROM, a PROM, an EPROM, an EEPROM or a FLASH memory, a hard disk or another magnetic or optical memory storing electronically readable control signals that can interact or do interact with a programmable computer system such that the respective method is performed. Therefore, the digital storage medium may be computer-readable. Some exemplary embodiments according to the disclosed subject matter thus comprise a data storage medium that has electronically readable control signals capable of interacting with a programmable computer system such that one of the methods described herein is performed.

Generally, exemplary embodiments of the disclosed subject matter may be implemented as a computer program product with a program code, the program code being effective to perform one of the methods when the computer program product runs on a computer. The program code may also be stored on a machine-readable storage medium, for example.

Other exemplary embodiments comprise the computer program for performing one of the methods described herein, the computer program being stored on a machine-readable storage medium.

In other words, an exemplary embodiment of the method according to the disclosed subject matter is therefore a computer program that has a program code for performing one of the methods described herein when the computer program runs on a computer. A further exemplary embodiment of the methods according to the disclosed subject matter is therefore a data storage medium (or a digital storage medium or a computer-readable medium) on which the computer program for performing one of the methods described herein is recorded.

A further exemplary embodiment of the method according to the disclosed subject matter is therefore a data stream or a sequence of signals that constitutes or constitute the computer program for performing one of the methods described herein. The data stream or the sequence of signals can be configured, by way of example, to the effect of being transferred via a data communication connection, for example via the Internet.

A further exemplary embodiment comprises a processing device, for example a computer or a programmable logic component, which is configured or adapted to the effect of performing one of the methods described herein.

A further exemplary embodiment comprises a computer on which the computer program for performing one of the methods described herein is installed.

In some exemplary embodiments, a programmable logic component (for example a field programmable gate array, an FPGA) can be used to perform some or all functionalities of the methods described herein. In some exemplary embodiments, a field programmable gate array can cooperate with a microprocessor in order to perform one of the methods described herein. Generally, the methods in some exemplary embodiments are performed on the part of an arbitrary hardware apparatus. The latter may be universally usable hardware such as a computer processor (CPU) or hardware specific to the method, such as an ASIC, for example.

It may be appreciated that combinations of one or more embodiments described herein, including combinations of embodiments described with respect to different figures, are contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The exemplary embodiments described above are merely an illustration of the principles of the disclosed subject matter. It goes without saying that modifications and variations to the arrangements and details described herein will become apparent to other persons skilled in the art. It is therefore intended that the disclosed subject matter be limited merely by the scope of protection of the claims that follow rather than by the specific details that have been presented herein using the description and the explanation of the exemplary embodiments.

The invention claimed is:

1. A method comprising:
   determining a blockchain transaction generated by a processing device set up for short-range communication; and
   generating, using the blockchain transaction, a signed blockchain transaction using:
   a secure computing device arranged in an area,
   wherein the signed blockchain transaction indicates a presence of the processing device in the area.

2. The method of claim 1, wherein the generating the signed blockchain transaction comprises:
   creating a blockchain transaction using the processing device;
   transmitting the blockchain transaction to the secure computing device; and
   signing the blockchain transaction using the secure computing device to obtain the signed blockchain transaction.

3. The method of claim 2, wherein the generating the signed blockchain transaction comprises:
   signing the blockchain transaction using the processing device; and
   signing the blockchain transaction using the secure computing device.

4. The method of claim 3, wherein the signing the blockchain transaction using the processing device comprises using a private key of the processing device.

5. The method of claim 2, wherein the blockchain transaction is based on a blockchain, wherein the method comprises:
   integrating the signed blockchain transaction into the blockchain.

6. The method of claim 1, wherein the generating the signed blockchain transaction is based on a signature, wherein
   the area is associated with the signature, wherein the signed blockchain transaction indicates a presence of the processing device at least one of adjacent to or at a short distance from the secure computing device in the area.

7. The method of claim 6, comprising:
assigning a time to the signed blockchain transaction, wherein the signed blockchain transaction associates the presence of the processing device in the area with the time.

8. The method of claim 1, wherein the short-range communication uses at least one of a wireless local area network, a Bluetooth® connection or a near field communication.

9. The method of claim 1, comprising:
transmitting the signed blockchain transaction to a subscriber in a system that comprises the processing device and the secure computing device.

10. The method of claim 1, wherein the presence of the processing device in the area corresponds to the processing device being in proximity to the secure computing device.

11. The method of claim 1, comprising:
verifying a presence of the secure computing device in the area using a verification entity.

12. The method of claim 1, wherein the generating the signed blockchain transaction is performed using at least one of hardware or software.

13. A computer program having a program code for performing the method of claim 1 when the computer program runs on a computer.

14. A hardware system for performing the method of claim 1.

15. A system comprising:
a secure computing device arranged in an area and set up for a short-range communication; and
a processing device set up for the short-range communication;
wherein the processing device is configured to transmit a blockchain transaction to the secure computing device using the short-range communication;
wherein the secure computing device is configured to:
receive the blockchain transaction;
sign the blockchain transaction using a signature to obtain a signed blockchain transaction; and
transmit the signed blockchain transaction to at least one of the processing device or a subscriber in the system;
wherein the system is configured to:
integrate the signed blockchain transaction into a blockchain; and
wherein the area is associated with the signature, wherein the signed blockchain transaction indicates a presence of the processing device adjacent to the secure computing device in the area.

16. The system of claim 15, wherein the short-range communication uses at least one of a wireless local area network, a Bluetooth® connection or a near field communication.

17. The system of claim 15, wherein the processing device is configured to sign the blockchain transaction using a private key of the processing device.

18. A system comprising at least one of:
a secure computing device arranged in an area and set up for a short-range communication; or
a processing device set up for the short-range communication;
wherein the processing device is configured to transmit a blockchain transaction to the secure computing device using the short-range communication;
wherein the secure computing device is configured to:
receive the blockchain transaction;
sign the blockchain transaction using a signature to obtain a signed blockchain transaction; and
transmit the signed blockchain transaction to at least one of the processing device or a subscriber in the system;
wherein the system is configured to:
integrate the signed blockchain transaction into a blockchain; and
wherein the area is associated with the signature, wherein the signed blockchain transaction indicates a presence of the processing device adjacent to the secure computing device in the area.

19. The system of claim 18, wherein the short-range communication uses at least one of a wireless local area network, a Bluetooth® connection or a near field communication.

20. The system of claim 18, wherein the processing device is configured to sign the blockchain transaction using a private key of the processing device.

* * * * *